(No Model.)
J. R. MAXWELL.
VALVE ARRANGEMENT FOR DUPLEX PUMPING ENGINES.
No. 295,500. Patented Mar. 18, 1884.
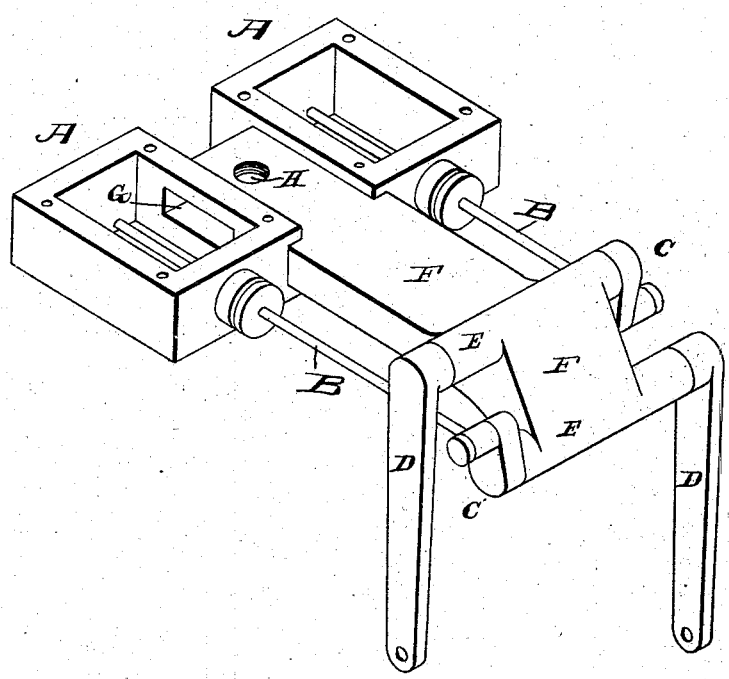
WITNESSES:
John R. Brodes
A. Myers
James R. Maxwell INVENTOR
by James W. See
ATTORNEY

UNITED STATES PATENT OFFICE.

JAMES R. MAXWELL, OF CINCINNATI, ASSIGNOR TO THE GORDON & MAXWELL COMPANY, OF HAMILTON, OHIO.

VALVE ARRANGEMENT FOR DUPLEX PUMPING-ENGINES.

SPECIFICATION forming part of Letters Patent No. 295,500, dated March 18, 1884.

Application filed September 15, 1883. (No model.)

*To all whom it may concern:*

Be it known that I, JAMES R. MAXWELL, of Cincinnati, Hamilton county, Ohio, have invented certain new and useful Improvements in Valve Arrangements for Duplex Pumping-Engines, of which the following is a specification.

In duplex pumping-engines a pair of steam-cylinders are arranged parallel each with its own valve, and are arranged in such manner that the piston-rod of one cylinder operates the valve of the other cylinder, usually through the medium of two rocker-arms, as generally constructed. The rocker-arms are carried in bearings bolted to the main frame of the pumping-engine. These bearings have to be so set and adjusted as to bring the somewhat complicated motion-work of the valves into line with the centers of the two independent steam-chests.

This invention relates to a novel construction of the steam-chests and supports for the rocker-shafts, whereby the entire valve mechanism may, in the process of manufacture, be treated as a self-contained separable structure.

The accompanying drawing represents in perspective an embodiment of my invention.

The drawing A represents the two steam-chests fitted to be bolted above the duplex cylinders of the engine; B, the two valve-stems; C, the two rock-shafts for actuating the valve-stems; D, the rock-arms, through which the two piston-rods actuate the rock-shafts in the usual manner; E, the bearings of the rock-shafts; F, the bracket-like projection of box form, cast with the two steam-chests, uniting them, and projecting forward into a juncture with the two bearings of the rock-shafts; G, a portway from one steam-chest to the other through the rear portion of the bracket F; H, a hole communicating with the port G for the reception of the steam-pipe. The two steam-chests, the portway uniting them, the connection for the steam-pipe, the two bearings for the rock-shafts, and the bracket supporting these bearings are all cast in one piece. Joints and bolts are avoided in construction, and the proper alignment, once being secured in the process of construction, cannot afterward become disturbed.

It is not essential in duplex pumping-engines that the two steam-chests be independent. They are in free communication with each other, and may, if desired, be in the form of a single chest containing the two valves, and provided with the double-valve movement. In such cases the steam-pipe would need to be connected to a wall of the steam-chest or to some portway communicating with the interior of the steam-chest, and the bracket F would project from the front of the large steam-chest.

I claim as my invention—

1. In the valve arrangement of duplex pumping-engines, the combination of a steam-chest, two rock-shaft bearings, and a bracket, F, joining said bearings to said steam-chest, substantially as and for the purpose specified.

2. In the valve arrangement of duplex pumping-engines, the combination of two steam-chests, a pair of rock-shaft bearings, and the bracket F, joining said bearings with said steam-chests, and extending between them to form a portway from chest to chest, substantially as and for the purpose specified.

JAMES R. MAXWELL.

Witnesses:
ISRAEL WILLIAMS,
J. W. SEE.